United States Patent
Shoda et al.

(10) Patent No.: US 8,508,160 B2
(45) Date of Patent: Aug. 13, 2013

(54) SERVO MOTOR POSITION CONTROL DEVICE

(75) Inventors: Kazuo Shoda, Tokyo (JP); Yuki Nomura, Tokyo (JP)

(73) Assignee: THK Co., Ltd., Tokyo (JP)

( * ) Notice: Subject to any disclaimer, the term of this patent is extended or adjusted under 35 U.S.C. 154(b) by 468 days.

(21) Appl. No.: 12/933,581

(22) PCT Filed: Mar. 27, 2009

(86) PCT No.: PCT/JP2009/056295
§ 371 (c)(1),
(2), (4) Date: Nov. 3, 2010

(87) PCT Pub. No.: WO2009/119810
PCT Pub. Date: Oct. 1, 2009

(65) Prior Publication Data
US 2011/0043159 A1 Feb. 24, 2011

(30) Foreign Application Priority Data
Mar. 28, 2008 (JP) ................................. 2008-087231

(51) Int. Cl.
*H02P 21/00* (2006.01)

(52) U.S. Cl.
USPC .................. 318/400.02; 318/400.01; 318/560; 318/609; 318/610; 318/611; 318/400.4; 318/721

(58) Field of Classification Search
USPC .............. 318/400.01, 400.02, 400.14, 400.4, 318/560, 568.18, 609, 610, 611, 721, 801, 318/432, 437, 625, 400.32, 400.38; 388/800, 388/825
See application file for complete search history.

(56) References Cited

U.S. PATENT DOCUMENTS
5,886,491 A * 3/1999 Yoshida et al. ............... 318/592

FOREIGN PATENT DOCUMENTS

| JP | 58-106610 A | 6/1983 |
|---|---|---|
| JP | 62-245312 A | 10/1987 |
| JP | 06-105594 A | 4/1994 |
| JP | 7-123767 A | 5/1995 |
| JP | 9-238490 A | 9/1997 |
| JP | 11-332278 A | 11/1999 |
| JP | 2000-197384 A | 7/2000 |
| JP | 2007-252093 A | 9/2007 |
| JP | 2008-043058 A | 2/2008 |
| WO | 2007/126024 A1 | 11/2007 |

OTHER PUBLICATIONS

International Search Report of PCT/JP2009/056295, mailing date Jun. 23, 2009.

* cited by examiner

*Primary Examiner* — Antony M Paul
(74) *Attorney, Agent, or Firm* — Westerman, Hattori, Daniels & Adrian, LLP

(57) ABSTRACT

Provided is a technique to suppress hunting in a range of a minimum resolution of a pulse encoder when a servo motor has reached a target position and stopped, thereby maintaining a stable stop state. A servo motor position control device uses a cascade configuration having a position control loop as a main loop and a velocity and current control loop as a minor loop. A proportion control is performed for a position control while a proportion integration control is performed for a velocity control and a current control. When the servo motor position has reached the target position and stopped (S201), a current instruction value for the current control is maintained at a value upon stop (S202) and the current control is switched to the proportion control (S204).

4 Claims, 8 Drawing Sheets

SERVO MOTOR POSITION CONTROL DEVICE

TECHNICAL FIELD

The present invention relates to a position control device that controls a driving position of a servo motor by feedback control, particularly to control for suppressing oscillation when the driving position of the servo motor reaches a target position and stops.

BACKGROUND ART

Frequently, servo motor position control is performed by a servo system having a cascade configuration in which a position control loop is set to a main loop while a minor loop is formed in the order of a velocity control loop and a current control loop. In consideration of stability and convergence of the servo system, the position control is performed by proportional control, and the velocity control and the current control are performed by proportional-integral control.

In the servo motor position control, a driving position (hereinafter also simply referred to as "position") of the servo motor is obtained by counting the number of pulses output from a pulse encoder using a pulse encoder attached to the servo motor. Generally, a driving velocity (hereinafter also simply referred to as "velocity") of the servo motor is obtained by dividing the number of pulse encoder pulses generated within a constant sampling time by the sampling time.

At this point, when the servo motor reaches the target position and stops, the pulse encoder does not output the pulse any more, and the position control is not performed. Therefore, depending on a control method, the servo motor may oscillate in a range of minimum resolution of the pulse encoder to generate hunting.

That is, the state in which the servo motor is stopped means that the position of the servo motor is located within a predetermined accuracy range from an instruction position, and it can also be said that the state is a stop instruction state. Methods, such as a method for decreasing a gain of a velocity control loop and a method for switching an electric phase angle of the servo motor from 90 degrees to zero degree when a position deviation between an actual position of the servo motor and an instruction position is zero or close to zero, are proposed as the method for controlling the hunting in the stop instruction state, which is caused by the position and velocity detection system using the pulse encoder.

Patent Document 1: Japanese Patent Application Laid-Open No. 62-245312
Patent Document 2: Japanese Patent Application Laid-Open No. 07-123767
Patent Document 3: Japanese Patent Application Laid-Open No. 11-332278

DISCLOSURE OF THE INVENTION

An object of the invention is to provide a technique of being able to maintain a more stable stop state by suppressing hunting in a range of minimum resolution of the pulse encoder that is a position sensor when the servo motor reaches the target position and stops.

In a servo motor position control device of the invention, the cascade configuration in which the position control loop is set to the main loop while the minor loop is formed in the order of the velocity control loop and the current control loop is adopted, the position control is performed by the proportional control, and the velocity control and the current control are performed by the proportional-integral control. One of the distinctive features of the servo motor position control device is that integral control in the current control is stopped when the servo motor reaches the target position and stops.

More particularly, a device that performs position control of a servo motor by feedback control, the servo motor position control device includes a position controller that derives and outputs a velocity instruction signal corresponding to a target velocity of the servo motor by proportional control from a position deviation in which a position signal corresponding to an actual position of the servo motor is subtracted from a position instruction signal corresponding to a target position in driving the servo motor;

a velocity controller that derives and outputs a current instruction signal corresponding to a current value to be applied to the servo motor by proportional-integral control from a velocity deviation in which a velocity signal corresponding to an actual velocity of the servo motor is subtracted from the velocity instruction signal; and a q-axis current controller that derives and outputs a q-axis voltage instruction signal corresponding to a voltage applied to a q-axis of the servo motor by proportional-integral control from a current deviation in which a q-axis current signal corresponding to a current value passed actually with respect to the q-axis of the servo motor is subtracted from the current instruction signal, wherein integral control in the q-axis current controller is stopped when the servo motor reaches the target position to eliminate the position deviation.

At this point, when the servo motor reaches the target position and stops, because the position deviation becomes zero, the velocity instruction output from the position controller becomes zero. Because the velocity deviation becomes basically zero, the current instruction signal becomes a substantially constant value. Therefore, because the current deviation in the q-axis current controller has a finite value at that point, occasionally the q-axis voltage instruction signal output from the q-axis current controller increases with time.

The current value applied to the servo motor increases gradually, the servo motor moves slightly, and the pulse encoder outputs the next pulse due to the slight movement of the servo motor. Therefore, the determination that the position deviation is generated is made, and the q-axis voltage instruction signal is output such that the servo motor moves in the reverse direction.

The servo motor repeats the minute iterative movement in a range of minimum resolution of the pulse encoder by the phenomenon, which results in one of causes of the hunting.

On the other hand, in the invention, the integral control in the q-axis current controller is stopped when the servo motor reaches the target position and stops to eliminate the position deviation. Therefore, even if the current deviation in the q-axis current controller has the finite value while the current instruction signal becomes the substantially constant value, the q-axis voltage instruction signal output from the q-axis current controller does not increase with time.

Accordingly, the servo motor can be prevented from moving carelessly in the stop state, and the generation of the hunting can be prevented.

In the invention, when the position deviation is eliminated, the proportional-integral control in the q-axis current controller may be switched to the proportional control while the value of the current instruction signal is maintained at a value at the time the position deviation is eliminated.

At this point, in moving the servo motor, it is well known that the servo motor should be moved while exceeding a cogging torque. In the servo motor, there are a position at which the servo motor stops easily and a position at which the servo motor stops hardly (the servo motor is biased by the cogging torque) due to the existence of the cogging torque. When the servo motor stops, the value of the current instruction signal is maintained at the value at the time the position deviation is eliminated, and the proportional-integral control in the q-axis current controller is switched to the proportional control. Therefore, a balance can be established between a torque generated in the servo motor by the q-axis voltage instruction signal and the cogging torque, and the position stability can be improved in the stop state of the servo motor. Accordingly, the hunting can more securely be prevented.

In such cases, because the q-axis current controller continues the proportional control, when the value of the q-axis current that is the current value applied actually to the q-axis of the servo motor changes for any cause, the value of the q-axis voltage instruction signal changes so as to compensate the change of the value of the q-axis current. Therefore, the stability can further be improved in the stop state of the servo motor.

In the invention, the value of the q-axis voltage instruction signal may be maintained at a value at the time the position deviation is eliminated, when the position deviation is eliminated.

That is, when the servo motor reaches the target position and stops, irrespective of the value of the current instruction signal and the computing result concerning the current control in the q-axis current controller, the output (the value of the q-axis voltage instruction signal) of the q-axis current controller is maintained at the value at the time the position deviation is eliminated. Therefore, the value of the q-axis voltage instruction signal can more simply be stabilized. The balance can be established between the cogging torque and the torque generated in the servo motor by the q-axis voltage instruction signal, and the position stability can further be improved in the stop state of the servo motor.

In the invention, a linear servo motor may be used as the servo motor.

When the servo motor position control is performed, only the position of the single servo motor is not controlled, but mostly the position of the servo motor is controlled while the servo motor is incorporated in a specific device, and the output is controlled as the device. Usually, in the rotary servo motor, the device frequently performs the output after a motion conversion mechanism such as a gear and a belt is added to the output shaft of the servo motor.

Because many mechanisms lie in the minute-amplitude hunting in a rotary servo motor, the hunting does not directly influence the output of the device in many cases. On the other hand, when the linear servo motor is used as the servo motor, the output of the device is directly fixed to a slider (moving element) of the linear servo motor in many cases, and the minute-amplitude hunting in the linear servo motor directly influences the output of the device in many cases.

Accordingly, the hunting suppressing effect can more prominently be obtained by applying the invention to the linear servo motor.

The above means can be combined to the utmost extent.

In the invention, when the servo motor reaches the target position and stops, the hunting can be suppressed in the minimum resolution range of the pulse encoder that is the position sensor to more stably maintain the stop state.

Figure 1:
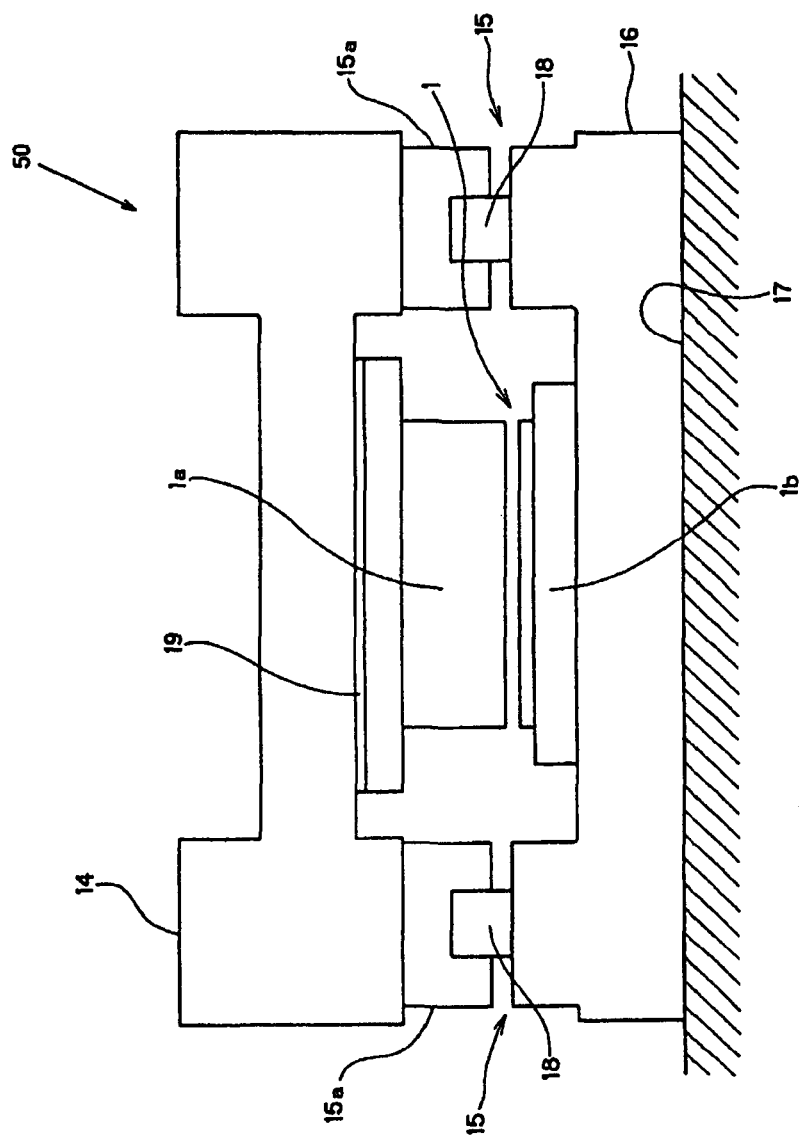
FIG. 1 is a sectional view illustrating a configuration of a driving guide device according to embodiments of the invention.

DESCRIPTION OF REFERENCE NUMERALS 1 linear motor (servo motor)
2 pulse encoder
2a linear scale
2b scale sensor
3 position detector
4 velocity detector
5 position controller
6 velocity controller
7 q-axis current controller
8 current transformer
9 three-phase/d-q coordinate converter
10 phase detector
11 d-axis current controller
12 d-q/three-phase coordinate converter
13 electric power converter
14 table
15 guide mechanism
15a moving block
15b load rolling groove
15c moving block body
15d end cap
16 base
17 surface plate
18 rail
18a ball rolling groove
19 heat insulator
21 end plate
22 stopper
23 scraper
25 magnetic pole sensor
26 bracket
27 cable chain attaching plate
28 cable chain support
29 power cable
30 signal cable
31 nylon tube
32 ball
50 driving guide device

BEST MODES FOR CARRYING OUT THE INVENTION

A servo motor position control device according to an embodiment of the invention will be described below with reference to the drawings.

First Embodiment

A first embodiment of the invention will be described with reference to the drawings. In the present embodiment, by way of example, it is described that position control of a linear servo motor is performed using a servo motor position control device according to the present invention.

First, a configuration of a linear servo motor 1 will be described with reference to FIGS. 1 to 4. As illustrated in FIG. 1, the linear servo motor (hereinafter referred to as linear motor) 1 includes a primary side 1a that is a conduction side including an armature coil and a secondary side 1b that is a non-conduction side including a magnet. In the first embodiment, the linear motor 1 constitutes a driving guide device 50. The primary side 1a of the linear motor 1 is coupled to a moving block 15a in a guide mechanism 15 with a table 14 interposed therebetween. The secondary side 1b of the linear motor 1 is fixed to a base 16, and the base 16 is fixed to an upper surface of a surface plate 17.

In the base 16, two rails 18 are provided in parallel with each other. The moving block 15a is configured to be able to obtain a driving force from the linear motor 1 to move along the rails 18.

In the driving guide device 50 of the first embodiment, a heat insulator 19 is provided between the primary side 1a of the linear motor 1 and the table 14 in order to suppress transmission of heat generated on the primary side 1a to the table 14. The heat generated by a driving current applied to an armature coil (not illustrated) on the primary side 1a is not transferred to the table 14 and the moving block 15a by providing the heat insulator 19 between the primary side 1a of the linear motor 1 and the table 14, which allows thermal expansion to be prevented in the table 14 and the moving block 15a. Therefore, a fluctuation is not provided to a preload (contact pressure) provided to rolling elements, such as plural balls, which are arrayed and accommodated in an infinite circulation path of the moving block 15a of the guide mechanism 15, and a rolling resistance can be maintained constant to realize a long-life of the driving guide device 50.

It is not necessary to provide the heat insulator 19, but an air-cooling unit such as a fin may be provided instead of the heat insulator 19. For example, the heat insulator 19 is made of an epoxy resin material containing glass or a ceramic material. A recess (not illustrated) that acts as a heat insulating space is provided in a portion surrounded by a lower surface of the table 14 and the heat insulator 19, which allows radiation heat to be blocked from the primary side 1a. The heat insulator 19 is lengthened along a longitudinal direction of the rail 18, that is, motion directions of the table 14 and moving block 15a, which allows rigidity to increase along the longitudinal direction of the rail 18 to prevent the oscillation phenomenon.

(Specific Configuration Example of Linear Servo Motor)

Figure 2:
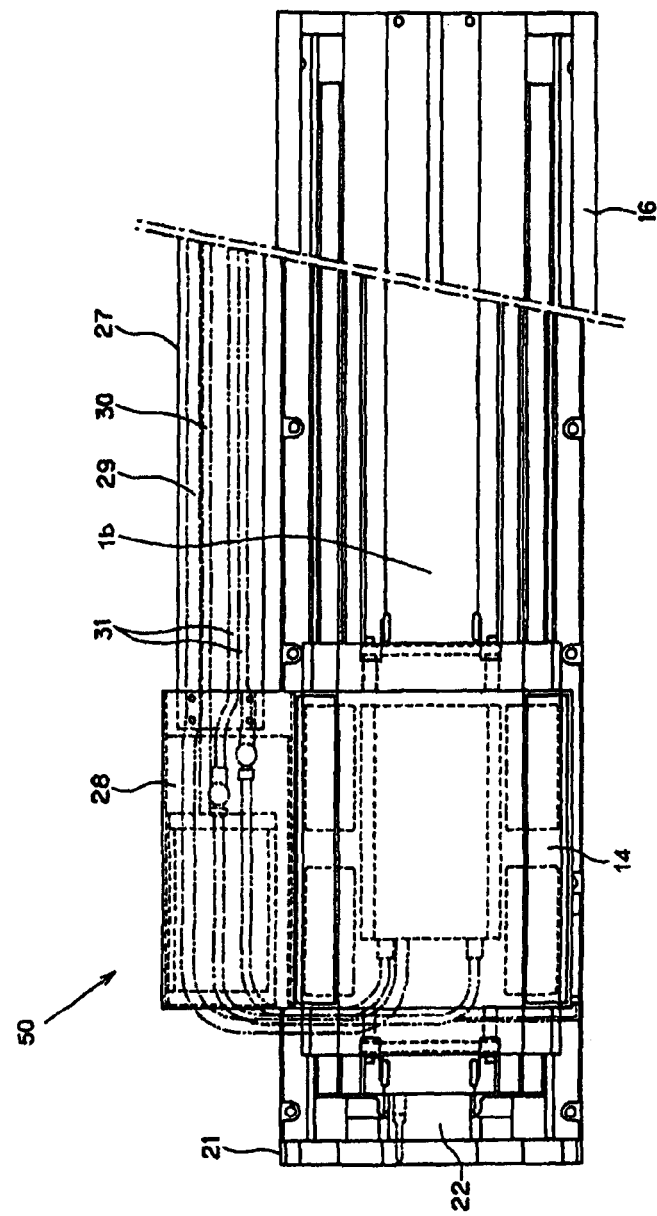
FIG. 2 is a front view illustrating the configuration of the driving guide device of the embodiments.
Figure 3:
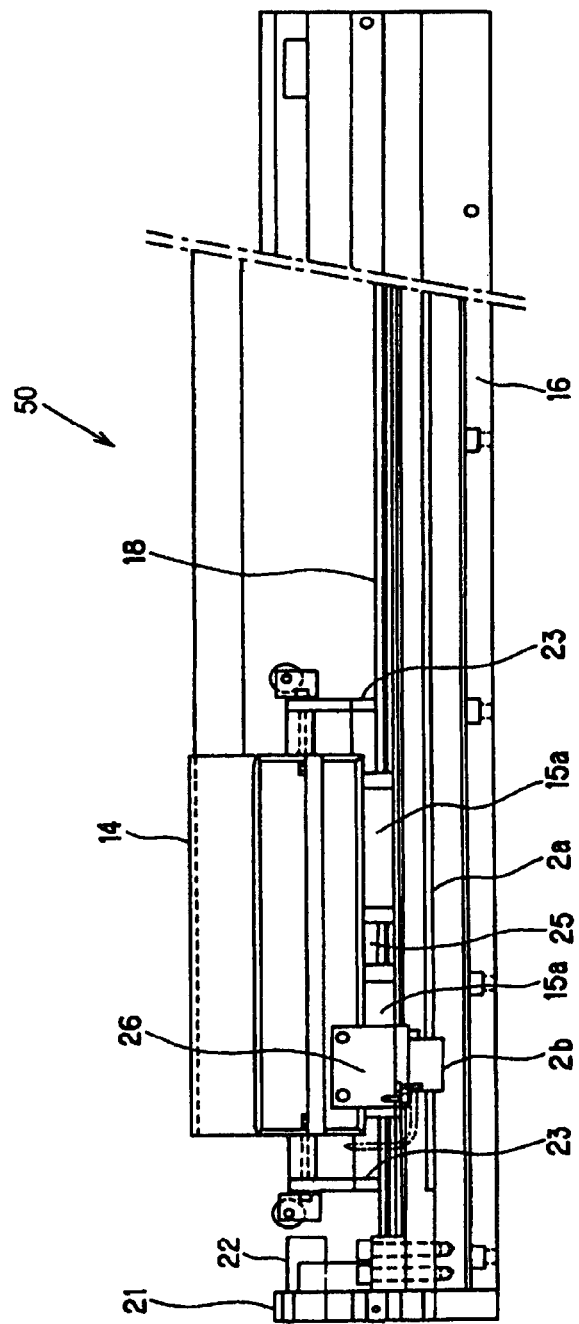
FIG. 3 is a side view illustrating the configuration of the driving guide device of the embodiments.

A specific configuration example of the driving guide device 50 of the first embodiment will be described below. FIGS. 2 and 3 illustrate a configuration example of the driving guide device 50 of the first embodiment. In FIGS. 2 and 3, the component designated by the same numeral as that in FIG. 1 indicates the same or equivalent component.

As illustrated in FIGS. 2 and 3, the primary side 1a of the linear motor 1 includes an armature coil and an armature core, and the secondary side 1b includes a magnet plate. The secondary side 1b is fixed onto the base 16. The rails 18 are provided on (fixed to) the base 16 in parallel with each other on both sides of the secondary side 1b of the linear motor 1, which includes the magnet plate.

In each of the rails 18, plural (two in the drawings) moving blocks 15a are movably provided along the rail 18. The table 14 is supported by the plural (four in the drawings) moving blocks 15a provided movably along the rail 18.

A magnetic interaction is generated between the primary side 1a and the secondary side 1b by applying the driving current to the armature coil (not illustrated) on the primary side 1a of the linear motor 1, thereby moving the primary side 1a along the secondary side 1b. The moving force is transmitted through the table 14 to the moving block 15a to move the moving block 15a along the rails 18.

End plates 21 are attached to both end portions of the base 16, and a stopper 22 is attached to each of the end plates 21. Scrapers 23 are attached to both ends of the table 14.

As illustrated in FIG. 3, an optical linear scale 2a that outputs a pulse according to a position of the moving block 15a with respect to the base 16 is provided in one of side portions of the base 16. The linear scale 2a is provided on the secondary side 1b, and a scale sensor 2b including an optical sensor is attached to one of side portions of the table 14 with a bracket 26 interposed therebetween. The scale sensor 2b reads the linear scale 2a to detect a moving position (moving distance) of the table 14.

The linear scale 2a and the scale sensor 2b constitute a pulse encoder 2. A magnetic pole sensor 25 including, for example, a Hall sensor is provided opposite the secondary side 1b of the table 14. The magnetic pole sensor 25 detects a kind of a magnetic pole of the magnet on the secondary side 1b. The magnetic pole sensor 25 outputs a signal of 0 or 1 according to the kind of the magnetic pole.

As illustrated in FIG. 2, a cable chain attaching plate 27 is attached to the other side portion of the base 16, and a cable chain support 28 is attached to the other side portion of the table 14. A power cable 29, a signal cable 30, and a nylon tube 31 are connected onto the primary side 1a of the linear motor 1 through the cable chain support 28. The power cable 29 is used to supply a driving electric power onto the primary side 1a of the linear motor 1 disposed in the cable chain attaching plate 27. The signal cable 30 is used to transmit and receive a signal. The nylon tube 31 is used to supply water for cooling the primary side 1a.

(Guide Mechanism)

Figure 4:
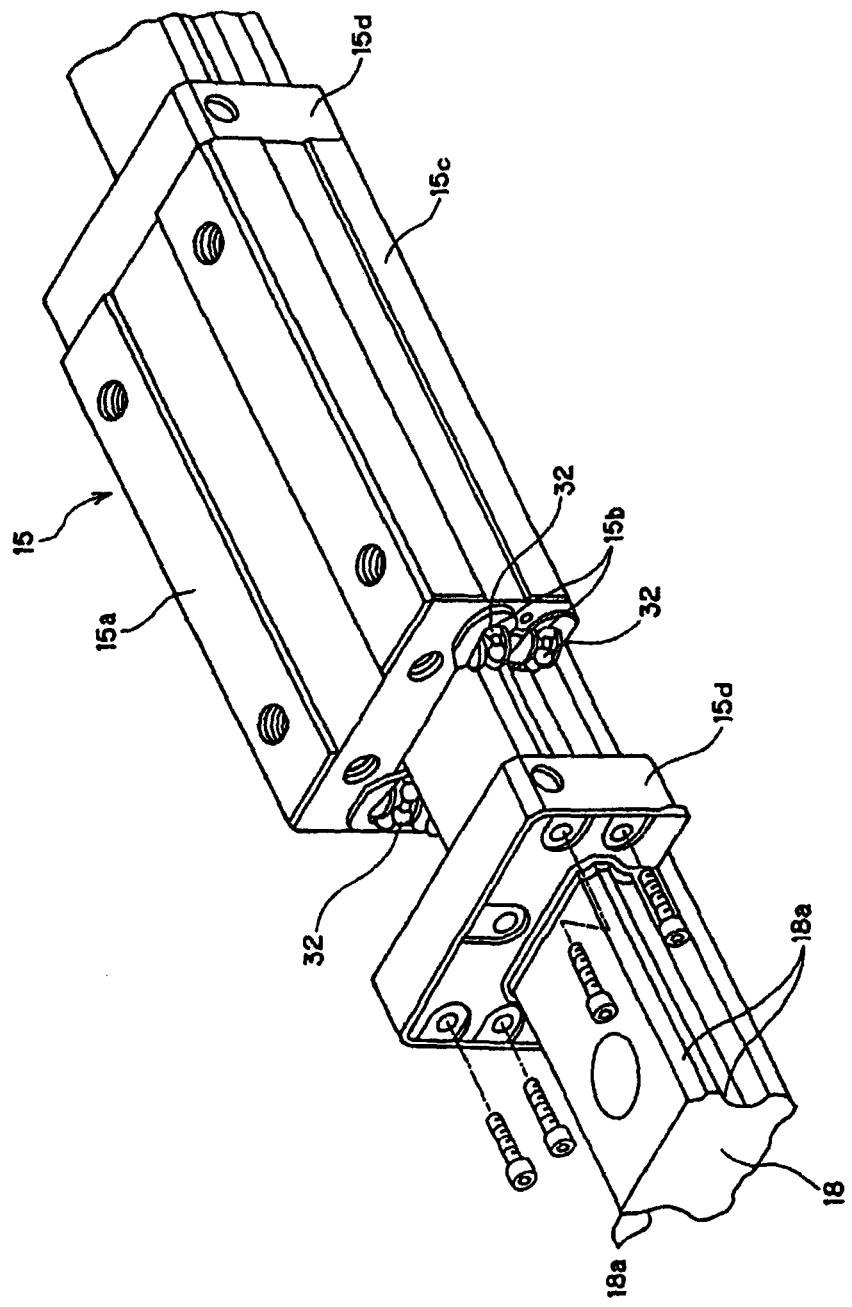
FIG. 4 is a perspective view illustrating a guide mechanism of the driving guide device of the embodiments.

FIG. 4 illustrates a detailed configuration of the guide mechanism 15. As illustrated in FIG. 4, in the rail 18 having a rectangular shape in section, two ball rolling grooves 18a that are a rolling surface for the rolling element are formed along the longitudinal direction in each of side faces, and the total of four ball rolling grooves 18a are formed in the side faces. The infinite circulation path including the load rolling groove 15b is formed in the moving block 15a, and the load rolling groove 15b constituting a load rolling element rolling path is located opposite the ball rolling groove 18a. In the infinite circulation path, plural balls 32 are arrayed and accommodated as the plural rolling elements that are roll and circulate between the ball rolling groove 18a and the load rolling groove 15b in association with a relative movement of the rail 18 and the moving block 15a. The guide mechanism 15 is configured to be able to apply a load in any direction such as a load in a radial direction, a load in a horizontal direction, and moment in each direction.

The moving block 15a includes a load rolling groove 15b, a moving block body 15c, and an end cap 15d. In the moving block body 15c, a ball return path is formed in parallel with the load rolling groove 15b. The end caps 15d includes a turn-around path that couples the load rolling groove 15b and the ball return path when the end cap 15d are joined to both ends of the moving block body 15c. The moving block 15a is attached so as to stride over the rail 18. The table 14 is mounted on the upper surface of the moving block 15a. The load rolling groove 15b formed in the moving block 15a is formed opposite each of the ball rolling grooves 18a formed in the rail 18, and plural balls 32 that are the rolling elements are sandwiched between the load rolling groove 15b and the ball rolling groove 18a. The balls 32 are delivered to the ball return path through the turn-around path formed in the end cap 15d in association with the movement of the moving block 15a, and the balls are guided to the load rolling groove 15b again, thereby circulating the balls in the infinite circulation path.

Figure 5:
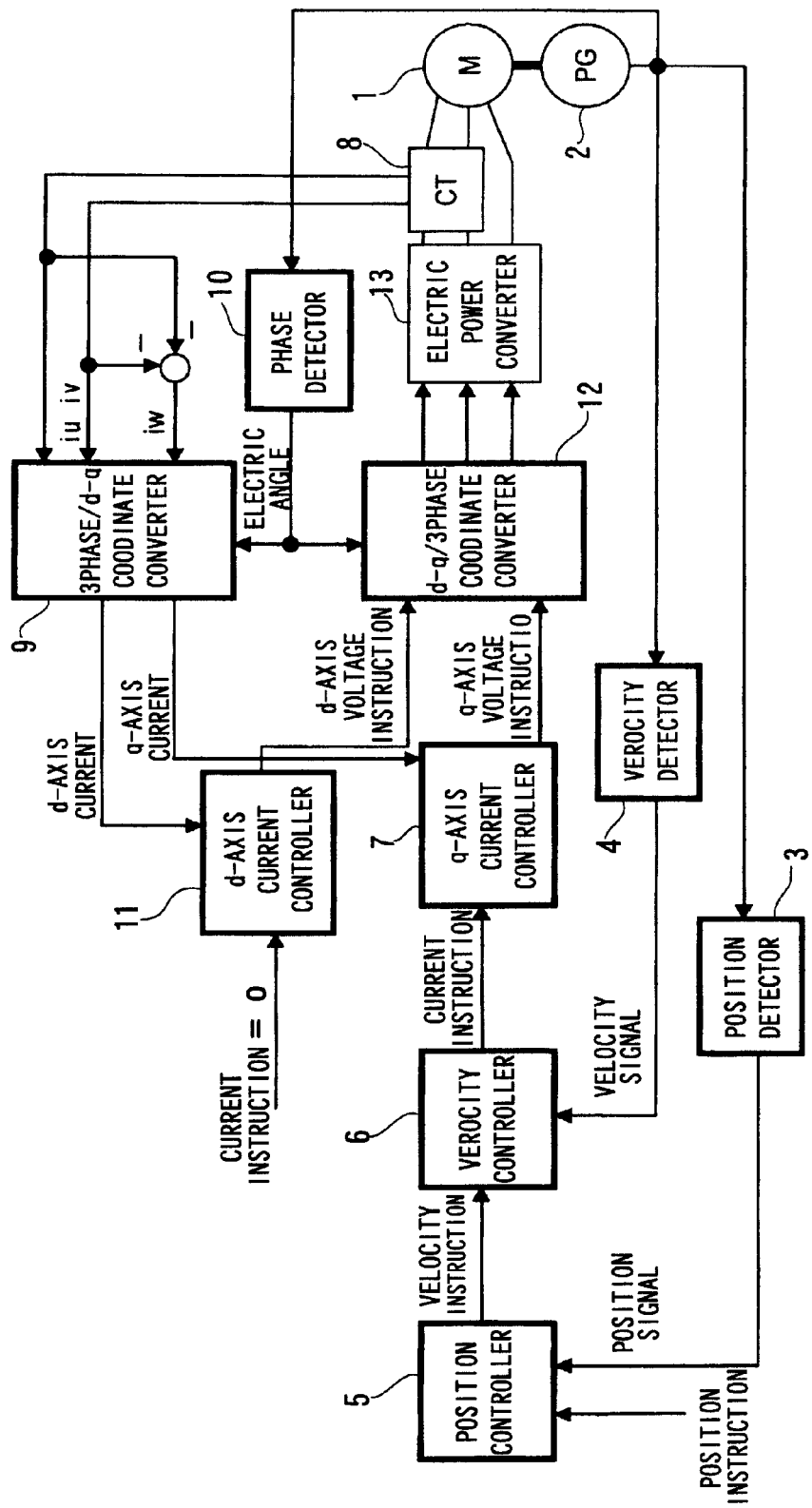
FIG. 5 is a block diagram of position control of a servo motor of the embodiments.

The position control of the linear motor 1 will be described below. FIG. 5 is a control bock diagram of the linear motor 1 by dq current control (vector current control) of the first embodiment. A position control device of the linear motor 1 of the first embodiment corresponds to a configuration except the linear motor 1 in FIG. 5, and the position control of the linear motor 1 is performed by the dq current control.

As described above, the position (specifically, the position of the moving block 15a with respect to the base 16) of the linear motor 1 is detected with the pulse encoder 2. It is also said that the pulse encoder 2 is a pulse generator that generates a pulse signal according to the position of the linear motor 1. The position signal (pulse signal) is input from the pulse encoder 2 to a position detector 3, a velocity detector 4, and a phase detector 10.

The position detector 3 counts the number of pulses from the pulse encoder 2 to generate the position signal corresponding to an absolute position of the linear motor 1. The position signal generated by the position detector 3 is input to a position controller 5. The velocity detector 4 computes and outputs a velocity signal corresponding to a velocity of the linear motor 1 from the pulse signal of the pulse encoder 2. The velocity signal is computed by dividing the number of pulses of the pulse encoder 2, generated in a constant sampling time, by the sampling time. The velocity signal generated by the velocity detector 4 is input to a velocity controller 6.

A position instruction signal corresponding to a target position of the linear motor 1 is input to the position controller 5, and the position controller 5 computes (derives) and outputs a velocity instruction signal by multiplying a position proportional gain by a position deviation which is obtained by subtracting the position signal from the position instruction signal. The velocity instruction signal output from the position controller 5 is input to the velocity controller 6.

The velocity controller 6 computes a velocity deviation by subtracting the velocity signal output by the velocity detector 4 from the velocity instruction signal, multiplies each of a velocity proportional gain and a velocity integral gain by the velocity deviation and an integral component in which the velocity deviation is integrated, and adds the products, thereby computing and outputting a current instruction signal. The current instruction signal output from the velocity controller 6 is input to a q-axis current controller 7.

On the other hand, as described above, the pulse signal output from the pulse encoder 2 is also input to the phase detector 10, and the phase detector 10 outputs positional information on the linear motor 1 as an electric angle.

In a value of a current applied to each of a three-phase coil of the linear motor 1, the current values of two phases are detected with a current transformer 8, and the remaining one phase is determined by computation. The current values of three phases are input to a three-phase/d-q AC coordinate converter 9. The three-phase/d-q AC coordinate converter 9 computes a q-axis current value and a d-axis current value from the current values of three-phase-coil U phase, V phase, and W phase of the linear motor 1 by three-phase/two-phase conversion computation and vector rotation computation, and outputs the q-axis current value and the d-axis current value.

The q-axis current controller 7 multiplies a q-axis current deviation in which the q-axis current signal output from the three-phase/d-q AC coordinate converter 9 is subtracted from the current instruction signal output from the velocity controller 6 by q-axis current proportional gain, multiplies an integrated value of the q-axis current deviation by a q-axis current integral gain, and adds the results of the multiplying, thereby outputting a q-axis voltage instruction signal.

On the other hand, the current instruction signal (=0) is input to a d-axis current controller 11. The d-axis current controller 11 multiplies a d-axis current deviation in which the d-axis current signal output by the three-phase/d-q AC coordinate converter 9 is subtracted from the current instruction signal (=0) by a d-axis current proportional gain, multiplies an integrated value of the d-axis current deviation by a d-axis current integral gain, and adds the result of the multiplying, thereby outputting a d-axis voltage instruction signal.

A d-q/three-phase AC coordinate converter 12 converts the d-axis voltage instruction signal and the q-axis voltage instruction signal into the voltage instruction signals with respect to the three-phase-coil U phase, V phase, and W phase of the linear motor 1. The voltage instruction signals are input to an electric power converter 13 and inverted into AC voltages.

Figure 6:
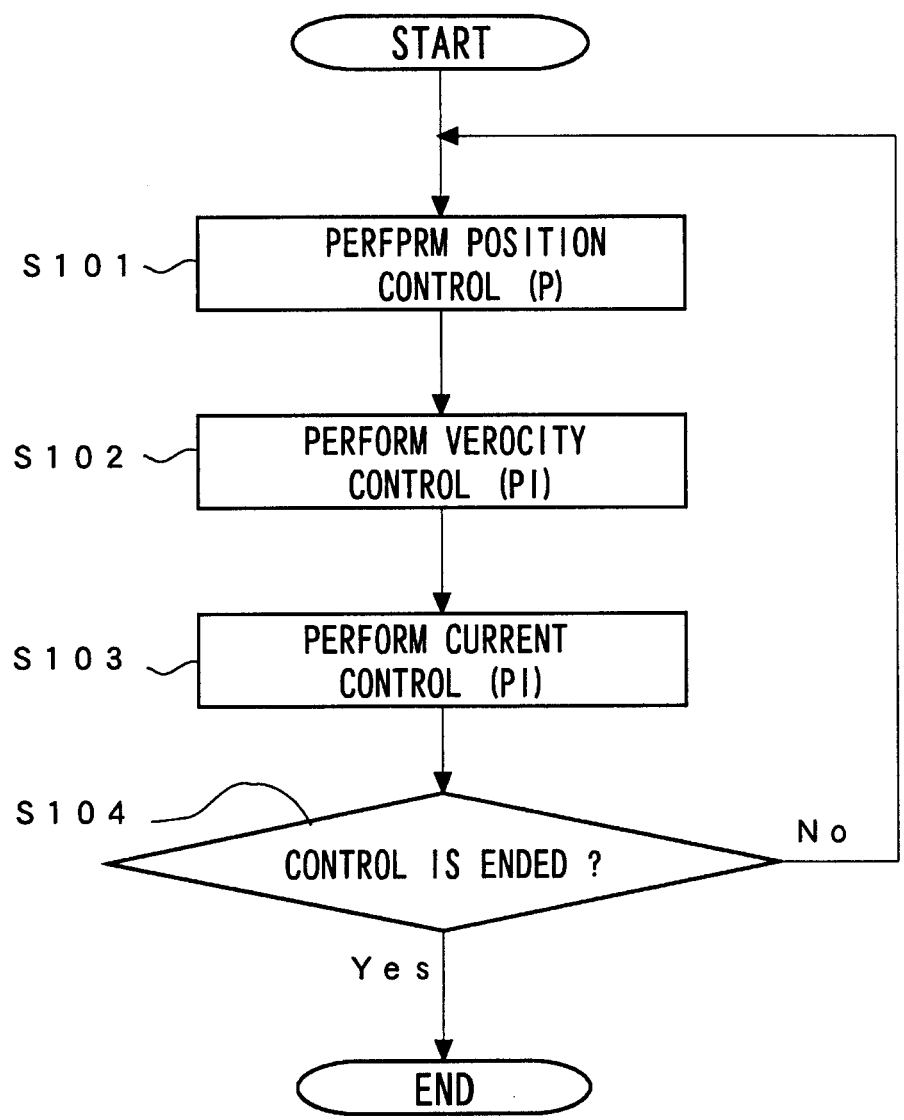
FIG. 6 is a flowchart of conventional position control of the servo motor.

A procedure of position control of a conventional linear motor 1 in the control block will be described below. FIG. 6 is a schematic flowchart illustrating the position control of the conventional linear motor 1.

When the flow of FIG. 6 is performed, in S101, the position controller 5 performs the computing by proportional (P) control using the position instruction signal and the position signal of the linear motor 1 based on a program or user input, thereby computing the velocity instruction signal. When the processing in S101 is ended, the flow goes to S102.

The velocity control is performed in S102. Specifically, the velocity controller 6 performs the computing by proportional-integral (PI) control using the velocity instruction signal computed in S101 and the velocity signal from the velocity detector 4, thereby computing the current instruction signal. When the processing in S102 is ended, the flow goes to S103.

The current control is performed in S103. Specifically, the q-axis current controller 7 performs the computing by proportional-integral (PI) control using the current instruction signal computed in S102 and the q-axis current signal from the three-phase/d-q coordinate converter 9, thereby computing the q-axis voltage instruction signal. The d-axis current controller 11 performs the computing by the proportional-integral (PI) control using the current instruction (=0) and the d-axis current signal from the three-phase/d-q coordinate converter 9, thereby computing the d-axis voltage instruction signal.

The d-q/three-phase coordinate converter 12 computes the voltage applied to each phase of the linear motor 1 according to the computed q-axis voltage instruction signal and d-axis voltage instruction signal, the electric power converter 13 converts the voltage into AC voltage and supplies the AC voltage to the linear motor 1. When the processing in S103 is ended, the flow goes to S104.

A determination whether the control of the linear motor 1 is ended is made in S104. In the cases of the affirmative determination in S104, the routine of FIG. 6 is ended, for example, when the control of the linear motor 1 is released for any reason. On the other hand, in the case of the negative determination, the flow returns to S101.

In the position control of the conventional linear motor 1, as long as the control is not ended, the proportional control in the position controller 5, the proportional-integral control in the velocity controller 6, and the proportional-integral control in the q-axis current controller 7 and the proportional-integral control in the d-axis current controller 11 are repeatedly performed in order in a predetermined control period.

At this point, the case in which the linear motor 1 reaches the target position and stops will be considered. In such cases, as long as the control of the linear motor 1 is not ended, the proportional control in the position controller 5, the proportional-integral control in the velocity controller 6, and the proportional-integral control in the q-axis current controller 7 and the proportional-integral control in the d-axis current controller 11 are repeatedly performed.

However, in the state in which the linear motor 1 reaches the target position and stops, because the position deviation between the position signal from the position detector 3 and the position instruction signal becomes zero, the velocity instruction signal output from the position controller 5 becomes substantially zero.

Because the velocity signal output from the velocity detector 4 also becomes basically zero, the velocity deviation in the processing of the velocity controller 6 becomes substantially zero. However, because the velocity controller performs the proportional-integral control, the current instruction signal having a substantially constant value is output at this point.

When the current instruction signal having the substantially constant value is input to the q-axis current controller 7, a finite q-axis current deviation is generated at that point between the current instruction signal and the q-axis current signal output from the three-phase/d-q coordinate converter 9. Because the q-axis current controller 7 also performs the proportional-integral control, the q-axis voltage instruction signal output from the q-axis current controller 7 may increase with time.

Therefore, the voltage value applied to the linear motor 1 also increases to generate a phenomenon in which the linear motor 1 moves slightly. When the pulse encoder 2 outputs the next pulse due to the slight movement of the linear motor 1, the determination that the position deviation is generated is made, and the q-axis voltage instruction signal is output such that the linear motor 1 moves in the reverse direction. The linear motor 1 repeats the minute iterative movement in a minimum resolution range of the pulse encoder 2 by the phenomenon, and the hunting may be generated.

In the first embodiment, in order to suppress the hunting, the value of the current instruction signal output from the velocity controller 6 is maintained at the value at that point at the time the linear motor 1 reaches the target position and stops, and the position deviation between the position instruction signal and the position signal is eliminated. At the same time, the control in the q-axis current controller 7 is switched from the proportional-integral control to the proportional control. Therefore, the q-axis voltage instruction signal that is the output of the q-axis current controller 7 can be prevented from increasing with time while the positional deviation between the position instruction signal and the position signal is eliminated. As a result, the linear motor 1 can be prevented from moving from the stop position in the stop state (stop instruction state).

Figure 7:
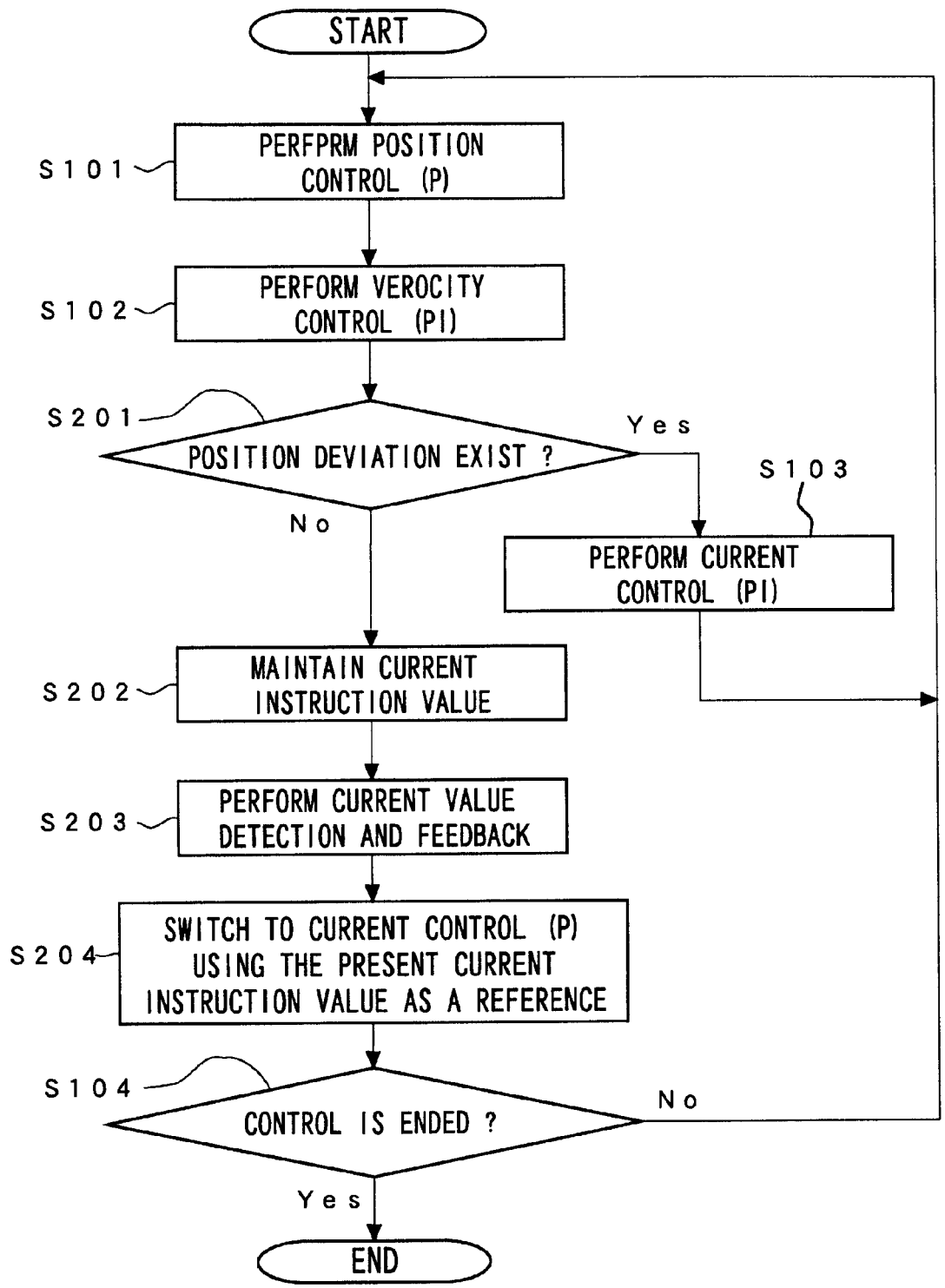
FIG. 7 is a flowchart illustrating a position control routine of the first embodiment.

FIG. 7 illustrates a flowchart of a position control routine of the first embodiment. The routine of FIG. 7 indicates a control procedure in the control block of FIG. 5. When the routine of FIG. 7 is performed, the pieces of processing in S101 and S102 are performed. Because contents of the pieces of processing in S101 and S102 are equal to those of the flow of the conventional position control, the description will not be repeated.

When the processing in S102 is ended, the flow goes to S201 to make a determination whether the position deviation exists, that is, a determination whether a difference exists between the position signal input to the position controller 5 and the position instruction signal. When the affirmative determination is made, the flow goes to S103. On the other hand, when the negative determination is made, the flow goes to S202. When the flow goes to S103, similarly to the flow of the conventional position control, the q-axis current controller 7 and the d-axis current controller 11 perform the proportional-integral (PI) control, and the flow returns to the processing in S101.

On the other hand, when the flow goes to S202, the current instruction signal that is the output signal of the velocity controller 6 is maintained at a constant value. At this point, the maintained value is a value of the current instruction signal at the time the position deviation becomes zero. When the processing in S202 is ended, the flow goes to S203.

In S203, the current transformer 8 continues the detection and feedback of the current value. That is, the feedback control is continued based on the current instruction signal at the time the position deviation becomes zero, and the three-phase/d-q coordinate converter 9 outputs the q-axis current signal and the d-axis current signal. When the processing in S203 is ended, the flow goes to S204.

In S204, the control in the q-axis current controller 7 and the control in the d-axis current controller 11 are switched from the proportional-integral (PI) control to the proportional (P) control. The q-axis current controller 7 performs the current control (P) based on the current instruction signal maintained in S202 and the q-axis current signal at this point. In addition, the d-axis current controller 11 performs the current control (P) based on the current instruction signal (maintains at the value of 0 from the beginning) and the d-axis current signal at this point. When the processing in S204 is ended, the flow goes to S104. Because the processing in S104 is equal to that of the prescribed position control routine, the description will not be repeated.

As described above, in the first embodiment, the current instruction signal that is the output value of the velocity controller 6 is maintained at the value at the time the position deviation becomes zero, when the position of the linear motor 1 reaches the target position and stops, that is, when the position deviation between the instruction position signal and the position signal of the linear motor 1 based on the pulse from the pulse encoder 2 becomes zero. At the same time, the control performed by the q-axis current controller 7 and the control performed by the d-axis current controller 11 are switched from the proportional-integral (PI) control to the proportional (P) control.

Therefore, the values of the q-axis voltage instruction signal and the d-axis voltage instruction signal, which correspond to the voltage applied to the linear motor 1, can be prevented from increasing with time by the integral control in the q-axis current controller 7 and the integral control in the d-axis current controller 11, and the hunting of the linear motor 1 can be suppressed. In the first embodiment, that the control performed by the q-axis current controller 7 is switched from the proportional-integral (PI) control to the proportional (P) control is also the stop of the integral (I) control in the q-axis current controller 7.

In the first embodiment, when the position deviation becomes zero between the position signal of the linear motor 1 and the instruction position signal, the current instruction signal that is the output value of the velocity controller 6 is maintained at the value at the time the position deviation becomes zero, and the control in the q-axis current controller 7 and the control in the d-axis current controller 11 are switched from the proportional-integral (PI) control to the proportional (P) control. However, contents of the control for preventing the hunting are not limited to the embodiment. For example, when the position deviation becomes zero, only the control in which the control in the q-axis current controller 7 and the control in the d-axis current controller 11 are switched from the proportional-integral (PI) control to the proportional (P) control (the integral (I) control in the q-axis current controller 7 is stopped) may be performed while the control is continued for the current instruction signal that is the output value of the velocity controller 6. Therefore, the hunting suppressing effect is also obtained.

Second Embodiment

A second embodiment of the invention will be described below. The control block diagram of the linear motor 1 of the second embodiment is equal to that of the first embodiment. In the second embodiment, when the position of the linear motor 1 reaches the target position and stops, that is, when the position deviation between the position instruction signal and the position signal of the linear motor 1 based on the pulse from the pulse encoder 2 becomes zero, the value of the q-axis voltage instruction signal that is the output signal of the q-axis current controller 7 is maintained at a constant value.

Figure 8:
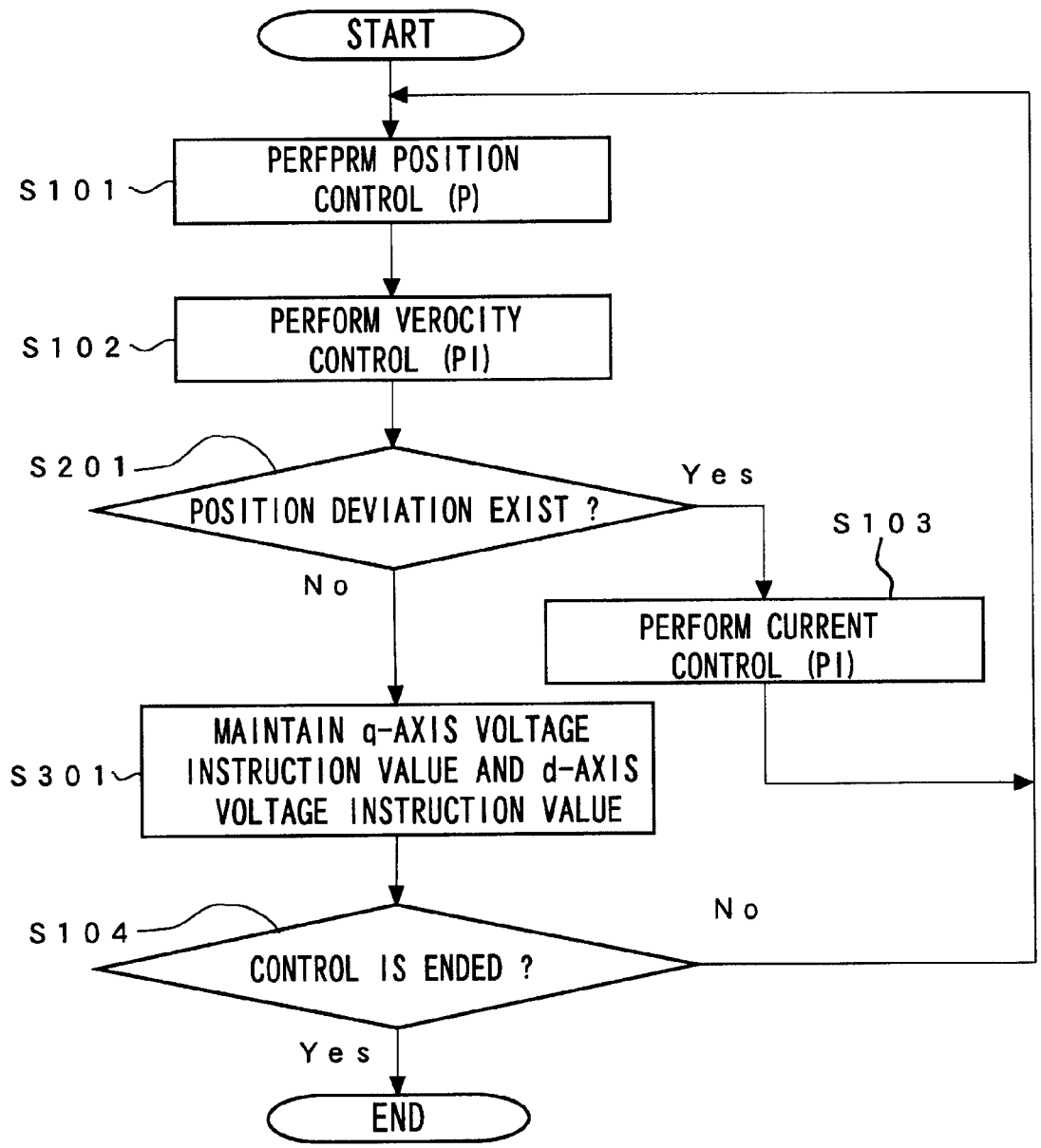
FIG. 8 is a flowchart illustrating a position control routine 2 according to a second embodiment of the invention.

FIG. 8 illustrates a flowchart of a position control routine 2 of the second embodiment. Only a point of the routine of FIG. 8, which is different from that of the position control routine of the first embodiment, will be described below. In the routine of FIG. 8, the flow goes to S301 when it is determined in S201 that the position deviation is eliminated.

In S301, the value of the q-axis voltage instruction signal and the value of the d-axis voltage instruction signal are maintained at constant values. The constant values are the values of the q-axis voltage instruction signal and d-axis voltage instruction signal at the time the determination that the position deviation is eliminated is made in S201. After the processing in S301 is ended, contents of the processing are equal to that of the position control routine.

As described above, in the second embodiment, when the position of the linear motor 1 reaches the target position and stops, that is, when the position deviation between the position instruction signal and the position signal of the linear motor 1 based on the pulse from the pulse encoder 2 becomes zero, the value of the q-axis voltage instruction signal and the value of the d-axis voltage instruction signal are maintained at the values at the time the position deviation becomes zero.

Therefore, in the stop (instruction) state, the voltage applied to the linear motor 1 can more securely be stabilized, and the hunting of the linear motor 1 can more securely be suppressed.

In the embodiments, the servo motor is the linear servo motor by way of example. However, it is obvious that the invention can be applied to the position control of a rotary servo motor. In the embodiments, the optical pulse encoder 2 is used by way of example. Alternatively, other pulse encoders such as a magnetic pulse encoder 2 may be used.

The invention claimed is:

1. A device that performs position control of a servo motor by feedback control, the servo motor position control device comprising:
a position controller that derives and outputs a velocity instruction signal corresponding to a target velocity of the servo motor by proportional control from a position deviation in which a position signal corresponding to an actual position of the servo motor is subtracted from a position instruction signal corresponding to a target position in driving the servo motor;
a velocity controller that derives and outputs a current instruction signal corresponding to a current value to be applied to the servo motor by proportional-integral control from a velocity deviation in which a velocity signal corresponding to an actual velocity of the servo motor is subtracted from the velocity instruction signal; and
a q-axis current controller that derives and outputs a q-axis voltage instruction signal corresponding to a voltage applied to a q-axis of the servo motor by proportional-integral control from a current deviation in which a q-axis current signal corresponding to a current value passed actually with respect to the q-axis of the servo motor is subtracted from the current instruction signal,
wherein integral control in the q-axis current controller is stopped when the servo motor reaches the target position to eliminate the position deviation.

2. The servo motor position control device according to claim 1, wherein the proportional-integral control in the q-axis current controller is switched to the proportional control while the value of the current instruction signal is maintained at a value at the time the position deviation is eliminated, when the position deviation is eliminated.

3. The servo motor position control device according to claim 1, wherein the value of the q-axis voltage instruction signal is maintained at a value at the time the position deviation is eliminated, when the position deviation is eliminated.

4. The servo motor position control device according to any one of claims 1 to 3, wherein the servo motor is a linear servo motor.

* * * * *